US006944687B2

(12) United States Patent
Doragh et al.

(10) Patent No.: US 6,944,687 B2
(45) Date of Patent: Sep. 13, 2005

(54) REDUCING POWER CONSUMPTION OF AN ELECTRONIC SYSTEM HAVING A COMMUNICATION DEVICE

(75) Inventors: Philip H. Doragh, Cypress, TX (US); Isaac Lagnado, Houston, TX (US); Chrismal R. Panditharathne, Houston, TX (US); Ronald M. Schooley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 392 days.

(21) Appl. No.: 10/126,059

(22) Filed: Apr. 19, 2002

(65) Prior Publication Data

US 2003/0200372 A1 Oct. 23, 2003

(51) Int. Cl.$^7$ ................................................ G06F 3/00
(52) U.S. Cl. ......................... 710/46; 710/109; 710/220
(58) Field of Search ................................ 710/8, 10, 12, 710/18, 19, 46–47, 107, 109–110, 305, 220; 370/449–451, 457, 463; 455/66.1

(56) References Cited

U.S. PATENT DOCUMENTS

| | | | | |
|---|---|---|---|---|
| 4,251,865 A | * | 2/1981 | Moore et al. | 710/109 |
| 4,638,428 A | * | 1/1987 | Gemma et al. | 710/241 |
| 5,289,378 A | * | 2/1994 | Miller et al. | 701/35 |
| 5,896,561 A | * | 4/1999 | Schrader et al. | 455/67.11 |
| 6,195,712 B1 | * | 2/2001 | Pawlowski et al. | 710/19 |
| 6,625,472 B1 | * | 9/2003 | Farazmandnia et al. | 455/557 |
| 6,640,268 B1 | * | 10/2003 | Kumar | 710/46 |

OTHER PUBLICATIONS

Don Anderson, *USB System Architecture*, MindShare, Inc., Chapter 6, USB Transfers, 1997 (pp. 71–108).

* cited by examiner

*Primary Examiner*—Khanh Dang

(57) ABSTRACT

A computer system comprises a host computer coupled to a wireless module via a digital interface. The wireless module permits the computer system to communicate with a wireless network. The host computer repeatedly polls the wireless module to determine whether it has received any incoming data from the wireless network, but preferably does not poll the wireless module all of the time. Periodic cessation of polling advantageously helps to extend battery life in the case of a host computer that operates off battery power. This concept, however, can be applied and is useful in the context of desktop electronic systems that operate from AC power.

33 Claims, 1 Drawing Sheet

REDUCING POWER CONSUMPTION OF AN ELECTRONIC SYSTEM HAVING A COMMUNICATION DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to power reduction in an electronic device. More particularly, the invention relates to reducing power in a notebook computer that has a wireless communication device connected thereto. Still more particularly, the invention relates to techniques for reducing power consumption in a battery-operated notebook having a digital interface to a wireless module that does not have a physical interrupt signal to permit the wireless module to alert the notebook computer of the presence of incoming data from the wireless network.

2. Background Information

As is commonly known, computers can be networked together to permit information to be transferred from one computer to another. Historically, the communication mechanism across the network has required a direct electrical connection to each computer over which data, commands and status information can be transferred. More recently, wireless communication modules have been developed to enable wireless networks.

Such wireless communication modules typically include an antenna, a transceiver, and a digital interface to the host computer. A typical wireless module is provided in the form of a circuit card which inserts into the side of notebook computer. An example of such a wireless module is a PCMCIA card which generally is slightly larger than a credit card and easily mates with the notebook through a PCMCIA card expansion slot which many notebooks include.

More recently, at least one computer manufacturer, Compaq Computer Corporation, has introduced a wireless module for a notebook computer in the form of a "MultiPort" device. A MultiPort module contains an antenna and wireless assembly in one package that mates with the rear surface of a notebook's display. Several advantages are obtained by placing the wireless electronics on the rear surface of the display including enhanced signal strength, greater throughput/speed, reduced susceptibility to externally generated noise, no protruding antenna to break off (PCMCIA card wireless modules typically have the antenna portion of the card protrude from the side of the notebook), and a reduced specific absorption rate. Compaq Computer Corp. currently has MultiPort modules available with a Universal Serial Bus ("USB") interface to the host notebook computer.

Notebook computers and other portable devices can operate either from alternating current ("AC") power through a power converter or from a battery. For obvious reasons, it is highly desirable for the batteries to power the notebook for as long as possible. All else being equal, however, adding additional features, devices and processing capabilities to notebook computers causes an increased power drain on the battery, thereby shortening battery life and requiring more frequent recharging. Accordingly, there is a constant tension when designing portable battery-operated electronic devices between performance on one hand and battery life on the other hand.

It has been observed that a battery in a notebook with a MultiPort wireless module has a shorter life than a comparable notebook with a PCMCIA card-based wireless module. Although the reduced battery life may not be excessively detrimental from the viewpoint of some users, it would be desirable not to have a reduction in battery life at all when using a MultiPort (or similar) wireless module. Accordingly, a solution to this problem is needed.

BRIEF SUMMARY OF THE PREFERRED EMBODIMENTS OF THE INVENTION

The problems noted above are solved in large part by providing a computer system that comprises a host computer coupled to a wireless module via a digital interface. The wireless module permits the computer system to communicate with a wireless network. The host computer repeatedly polls the wireless module to determine whether it has received any incoming data from the wireless network, but preferably does not poll the wireless module all of the time. Periodic cessation of polling advantageously helps to extend battery life in the case of a host computer that operates off battery power. This concept, however, can be applied and is useful in the context of desktop electronic systems that operate from AC power.

In accordance with a preferred embodiment of the invention, at first predefined periods of time, the host computer's CPU polls the wireless module to determine if the wireless module has received any data from the wireless network, but does not poll the wireless module at second predefined periods of time. The first predefined period of time may begin with a request for data transmitted from the wireless module to the wireless network and may end upon receipt of the requested data from the wireless network. Alternatively, the first predefined period of time may begin a period of time (a "third" period of time) after a request for data is transmitted from the wireless module to the wireless network and may end upon receipt of the requested data from the wireless network. Further, this third period of time may be preset, programmable or may dynamically vary during run time. Further still, the host computer can be programmable to permit a user to select one of a variety of power modes which implement various embodiments of the host computer communicating with the wireless module as described herein.

By implementing the aforementioned embodiments, electrical power is conserved and thus, for battery operated devices, battery life is extended. These and other advantages will become apparent upon reviewing the following disclosures.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
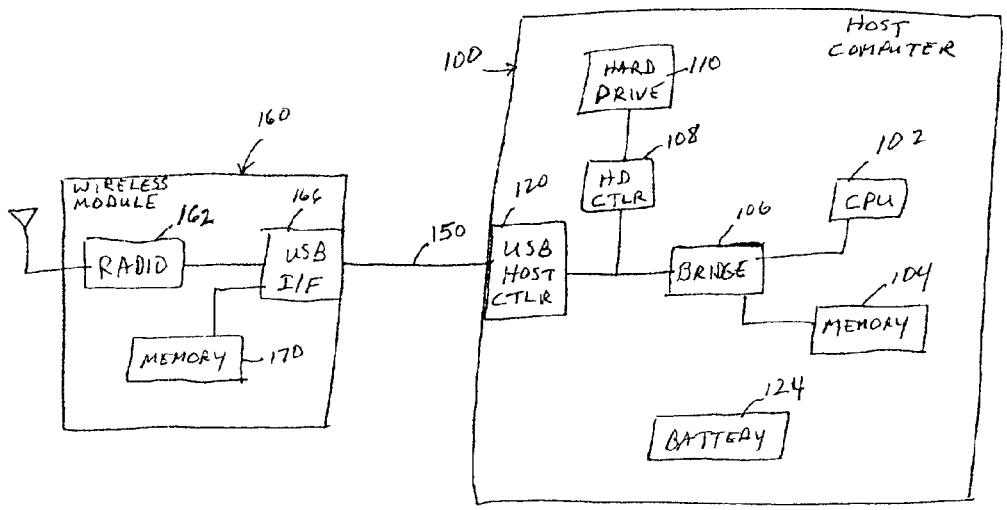
FIG. 1 shows a system diagram of a host computer coupled to a wireless module.

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. In addition, no distinction is made between a "processor," "microprocessor," "microcontroller," or "central processing unit" ("CPU") for purposes of this disclosure. To the extent that any term is not specially defined in this specification, the intent is that the term is to be given its plain and ordinary meaning.

DETAILED DESCRIPTION OF THE PREFERRED EMBODIMENTS

It has been determined that the reduction in battery life noted above in a notebook with a MultiPort wireless module results from the way in which the USB interface is used to interface to the wireless module. Unlike many other types of digital busses, the USB standard does not provide for a physical interrupt signal. Accordingly, the MultiPort wireless module, as with other USB devices, cannot simply assert a physical interrupt signal to the host computer to alert the notebook that the wireless module has received incoming data from the wireless network. Instead, the host notebook repeatedly polls the wireless module to find out if any data has been received from the wireless network.

As one of ordinary skill in the art will know, communication across a USB bus involves the use of one or more of four different types of communication "pipe." These pipes include the "interrupt" pipe (which is not a physical interrupt signal), a "bulk" pipe, an "isochronous" pipe, and a "control" pipe. The software drivers that have been established for wireless USB modules and other types of devices of the same class typically poll the input "bulk pipe" associated with the wireless device. Typically, immediately after the host initializes, the client USB driver requests the USB host controller driver to fill a memory buffer with incoming data, if any exists, from the wireless module. In response, the host driver repeatedly polls the bulk input pipe associated with the wireless module until data, in fact, is present and the memory buffer is filled with the requested data. The host driver does not stop polling the wireless module until input data is present and available to the host.

Because of the relatively high data rates that typify network traffic, the host notebook polls the wireless USB module numerous times per second. For example, polling may occur at a rate of once every 100 nanoseconds, which means 10 million times per second. Each time the notebook polls the wireless module for the presence of incoming network data, battery power is consumed. The power consumption involves the notebook itself sending out a request to the wireless module to report back the presence of data and the wireless module replying to the notebook's request.

A PCMCIA wireless module has access to an interrupt line which it can strobe to alert the host computer of the presence of incoming data. Thus, the notebook need not repeatedly poll the PCMCIA wireless module as it must for USB-based wireless modules. It has been determined that the device polling that typifies USB wireless modules is the root cause of the extra power drain on the notebook's battery relative to a comparable notebook with an interrupt-based wireless module.

In accordance with the preferred embodiment of the invention, a host computer system (e.g., a notebook computer) sends data to and receives data from a wireless network via a wireless module without repeatedly and continuously polling the wireless module. Although the wireless module of the preferred embodiment comprises a USB interface to the host computer, other embodiments of the invention include other types of digital interfaces, and in particular, interfaces that do not permit the wireless module to alert the host of incoming data by asserting a physical interrupt signal.

Referring now to FIG. 1, a host computer system 100 and a wireless module 160 are shown constructed in accordance with a preferred embodiment of the invention. As shown, the host computer includes a CPU 102, volatile memory 104, a bridge device 106, a hard disk controller 108, a hard disk drive 110, a USB host controller 120 and a battery 124. Other components may be included as well and the arrangement of the components shown in FIG. 1 can differ as desired. In general, the bridge device 106 interconnects the CPU 102, memory 104, hard disk controller 108 and USB host controller 120. The CPU 102 can be any processor desired, such as a Pentium 4 processor from Intel. The volatile memory 104 preferably comprises the main system random access memory ("RAM") 104. The hard disk controller 108 controls access to the hard disk drive 110. The USB host controller 120 permits the host computer 100 to access USB devices such as the wireless module 160. The battery 124 powers the various devices of the host computer 100 as well as the wireless module 160.

Figure 2:
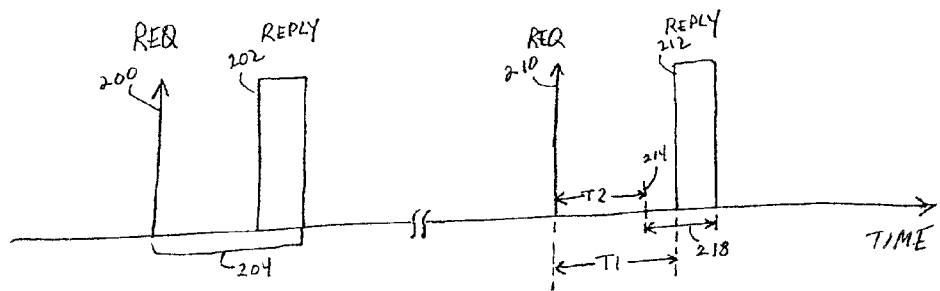
FIG. 2 illustrates several of the preferred embodiments of the invention for extending battery life.

In accordance with many types of wireless network communication protocols, each computer initiates data transfers on the network. Each computer initiates the sending of data to a remote node on the network as well as initiating the process of receiving data from a remote node. Thus, it is typically the case that data is received by a computer in response to a request transmitted by the computer for the data. As such, it can reasonably be determined when data is expected to arrive and thus, it can be reasonably determined when data is not expected to arrive at the computer. This point is further illustrated with respect to FIG. 2. Referring now to FIG. 2, the host computer 100 may transmit requests for data through its wireless module 160 to the wireless network. These events are denoted by reference numerals 200 and 210. At some finite amount of time following the transmission of the request 200, 210, the requested data is transmitted back to the host computer. Such reply events are denoted by reference numerals 202 and 212. As such, there are relatively long periods of time in which the host computer's wireless module 160 is not receiving data from the network. The preferred embodiment of the invention takes advantage of this observation.

In accordance with a preferred embodiment, the host computer ceases polling the bulk input pipe associated with the wireless module 160 except during those times in which it is reasonably probable that the wireless module will receive data from the wireless network. Because input data is generally transmitted to the wireless module from the network after the requests 200, 210 are transmitted, in one embodiment the bulk input pipe is only polled by the host computer 100 during a time window which begins upon transmission of the request and ends upon receipt of the requested data. This is shown in FIG. 2 as time window 204. Thus, the host computer begins polling the bulk input pipe upon or immediately after sending out a request for data from the network. Battery power is saved by ceasing the bulk input pipe polling during all other times.

Even after sending out a request for data to the network, there is a finite amount of time during which the network will not have time to return the requested data. In an alternative embodiment, the host computer waits for a time period following a transmission of a request for data command before polling the bulk input pipe. Referring still to FIG. 2, this point is illustrated with regard to data request 210 and reply 212 as event 214. The response time T1 that it takes for the host computer's request to be transmitted to the network and acted upon by the network and the data provided back to the host computer is a function of a number of variables. Such variables include the rated transmission rate of the network, the latency of the network, other traffic on the network, the number of errors that occur in the transmission which require retransmission of packets containing bit errors, etc. However, one of ordinary skill in the art can determine or estimate the response time T1 for a reply. The time T1 can be computed based on known network behavior or measured with conventional measurement devices such as network analyzers and the like. In fact, the host computer 100 or its wireless module 120 can measure the time interval T1 using a conventional timer circuit and thereby track T1 on an ongoing basis. The response time T1 may vary from transaction to transaction and may vary as a result of changing network conditions. At any rate, an average response time T1 can be determined.

Because the reply data will not be transmitted back to the host for a finite amount of time T1, there is no need for the host computer 100 to repeatedly poll its wireless module 160 for the entire time T1. Repeatedly polling the wireless module from request 210 to reply 212 simply wastes battery power when no reply data is yet available. Instead, and in accordance with a preferred embodiment, the host computer does not poll its wireless module for a time T2 after the request is transmitted from the host to the network. The time T2 preferably comprises a period of time during which it is guaranteed or at least reasonably assured that the requested data will not be transmitted back to the host's wireless module due to latency in the network itself. Thus, during time T2 the host preferably does not poll the wireless module for incoming data. Event 214 marks the point in time after which it can no longer be guaranteed or reasonably assumed that the requested data will not be provided to the host's wireless module. Thus, after time T2 (i.e., during time window 218), the host polls the bulk input pipe associated with the wireless module's USB interface 166. Then, once the input data is retrieved into the host computer, the host preferably ceases polling the bulk input pipe until a time T2 after its next request for data or service from the network. By ceasing polling of the wireless module's USB interface during time interval T2, less battery power is consumed.

Time T2 is a function of when the reply data is expected to be received by the wireless module. Time T2 can be preset in the host computer or it can be programmable via a graphical user interface. Further still, the host can dynamically vary T2 during runtime. In this latter embodiment, during runtime, the host preferably measures the time between transmitting a request for data and the receipt of the reply data (T1). Tracking T1 between pairs of data requests and replies permits the host to dynamically vary time interval T2 to tune it to varying communication conditions. That is, as T1 increases, the host can increase T2, and vice versa. If desired, T2 can be programmed or preset to be a certain percentage of T1. For example, T2 could be programmed as 80% of T1 meaning that the host will begin polling the bulk input pipe after 80% of previous time intervals T1 has elapsed. The host could be set to perform a running average of the previous five T1s and then set T2 at 80% of that computed value. Numerous other techniques for varying T2 are also possible and within the scope of this disclosure.

There are numerous ways to specify or determine time interval T2. It should be understood, however, that time T2 represents a tradeoff between battery life and communication efficiency. A longer time T2 results in less wireless module polling and thus greater battery life. A longer time T2 also increases the risk that the host computer will miss the initial part of the data transmission from the network into the wireless module. A shorter time for T2 reduces battery life, but decreases the risk of missed input data. It should also be understood that even if some data is missed, conventional wireless communication protocols provide the automatic retransmission of any missed data.

Although the USB standard does not include a provision for a physical interrupt signal, USB does include a communication channel called an "interrupt pipe." The host computer can poll the interrupt pipe at a programmable rate which generally is slower than the rate at which it can poll the bulk input pipe. The bulk input pipe can be polled as often as once every four microseconds. The interrupt pipe can be polled only once every one millisecond or slower. In the context of wireless communication modules, given the amount of memory present in the buffer (e.g., 2048 bytes) and the data rate of traffic to/from the wireless network, host computers employing conventional wireless USB modules do not poll the interrupt pipe as a way to determine the presence of incoming data. Bulk input pipe polling is preferred because, if interrupt pipe polling was used, the wireless module's internal memory buffer will likely be filled and data will overflow the buffer before the next interrupt pipe polling event. This problem would be further exacerbated by the latency inherent in the USB software "stack" of drivers. That is, it would take a non-trivial amount of time for the host computer to react to an interrupt pipe indicating that the wireless module does indeed have incoming data to be read by the host computer. During this non-trivial period of time, additional data is likely to be received by the wireless module from the network and thus even more data will overflow the module's internal buffer. Therefore, it is generally perceived that the USB interrupt pipe mechanism is not useful for determining the presence of incoming network data due to its relatively infrequent ability to be polled.

However, standard communication protocols typically include provisions for communication packets to be retried in the event of an error. Automatic retry provisions are included in various known layers of the communication hierarchy. Thus, in accordance with another embodiment of the invention, the host computer 100 polls the "interrupt pipe" associated with the wireless module to determine when the wireless module has data. The response to an interrupt pipe polling may be any desired type of message that indicates whether or not data has been received. For example, via the interrupt pipe, the wireless device may simply report its current state as "active" or "idle." An active state means that the module is performing an action on behalf of the host computer (e.g., transmitting data to or receiving data from the network). An idle state means that the module is not performing an action on behalf of the host computer. Polling the interrupt pipe permits the host computer to determine when the wireless module has changed state. In accordance with this embodiment, the host computer 100 does not poll the bulk input pipe associated with its wireless module 120 until the wireless module indicates, via the interrupt pipe, that has changed from the idle to active state. At that point, the host begins polling the bulk input pipe to retrieve the input data.

Each of the embodiments discussed above has advantages and disadvantages. The conventional technique in which bulk input pipe polling begins occurring on device initialization and continues until data is received permits the highest performance in that no data will be dropped. However, this embodiment results in higher battery power consumption relative to the other embodiments. At the other end of the spectrum, the embodiment which uses interrupt pipe polling as a mechanism to determine the presence of data minimizes battery consumption, but suffers from reduced performance due to the relative infrequency of the interrupt pipe polling. The other embodiments which permit bulk input polling only during certain windows of time in which it is reasonably assured that data will imminently be received from the network fall in between. The embodiment in which bulk input pipe polling during time window 204 which begins upon sending out a request for data has a higher performance, but greater battery power drain than the embodiment in which bulk pipe polling occurs only during time window 218.

Any, some or all of these embodiments can be implemented in a host computer with a wireless module. Further, if desired, the host computer 100 can provide the user the ability to select which one of the embodiments he or she wishes the computer to implement. Thus, the user can configure the host computer so as to provide the tradeoff between battery power and communication performance as desired by the user. The user selection can be via any suitable type of graphical user interface. For example, the user may simply be provided with the ability to control the priority level of battery life. The host computer 100 can implement whatever wireless module polling technique best suits the user's battery life prioritization level. In this way, the user simply specifies to what extent the computer should strive to save battery life (e.g., on a scale of 1–4 or other suitable user input mechanism) and need not be burdened with understanding the intricacies of the communication issues discussed herein. Of course, there are a wide variety of ways that a user can be permitted to program the computer to implement one of the embodiments discussed above versus the others.

By reducing the number of times that the host computer polls the bulk input pipe associated with the wireless module, the host computer's battery life is extended. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a host CPU; and
   a wireless module coupled to said host CPU via an electrical connection to permit the computer system to communicate with a wireless network;
   wherein, at first predefined periods of time, said host CPU polls said wireless module to determine whether said wireless module has received any input data from the wireless network, but, at second predefined periods of time, does not poll said wireless module to determine whether said wireless module has received any Input data from the wireless network.

2. The computer system of claim 1 wherein each first predefined period of time begins with a request for data transmitted from the wireless module to the wireless network and ends upon receipt of the requested data from the wireless network.

3. The computer system of claim 1 wherein each first predefined period of time begins a third period of time after a request for data is transmitted from the wireless module to the wireless network and ends upon receipt of the requested data from the wireless network.

4. The computer system of claim 3 wherein said third period of time is preset.

5. The computer system of claim 3 wherein said third period of time is programmable.

6. The computer system of claim 3 wherein said third period of time dynamically varies.

7. The computer system of claim 1 wherein said second predefined periods of time begin upon receipt of data from the wireless network and ends on transmission of a request for data from the wireless module to the wireless network.

8. The computer system of claim 1 wherein said second predefined periods of time begin upon receipt of data from the wireless network and ends a third period of time after a request for data is transmitted from the wireless module to the wireless network.

9. The computer system of claim 8 wherein said third period of time is preset.

10. The computer system of claim 8 wherein said third period of time is programmable.

11. The computer system of claim 8 wherein said third period of time dynamically varies.

12. The computer system of claim 1 wherein said wireless module couples to the host CPU via an interface that does not include a physical interrupt signal to permit the wireless module to alert the host CPU of the presence of incoming data from the wireless network.

13. The computer system of claim 1 wherein said wireless module couples to the host CPU via an interface that comprises a USB interface.

14. A computer system, comprising:
   a host CPU; and
   an interface electrically coupled to said CPU and adapted to be electrically coupled to a wireless module to thereby permit the computer system to communicate with a wireless network;
   wherein, at first predefined periods of time, said host CPU causes said interface to poll said wireless module to determine whether said wireless module has received any input data from the wireless network, but, at second predefined periods of time, does not poll said wireless module to determine whether said wireless module has received any input data from the wireless network.

15. The computer system of claim 14 wherein each first predefined period of time begins with a request for data transmitted from the wireless module to the wireless network and ends upon receipt of the requested data from the wireless network.

16. The computer system of claim 14 wherein each first predefined period of time begins a third period of time after a request for data is transmitted from the wireless module to the wireless network and ends upon receipt of the requested data from the wireless network.

17. The computer system of claim 16 wherein said third period of time is preset.

18. The computer system of claim 16 wherein said third period of time is programmable.

19. The computer system of claim 16 wherein said third period of time dynamically varies.

20. The computer system of claim 14 wherein said second predefined periods of time begin upon receipt of data from the wireless network and ends on transmission of a request for data from the wireless module to the wireless network.

21. The computer system of claim 14 wherein said second predefined periods of time begin upon receipt of data from the wireless network and ends a third period of time after a request for data is transmitted from the wireless module to the wireless network.

22. The computer system of claim 21 wherein said third period of time is preset.

23. The computer system of claim 21 wherein said third period of time is programmable.

24. The computer system of claim 21 wherein said third period of time dynamically varies.

25. The computer system of claim 14 wherein said interface does not include a physical interrupt signal to permit the wireless module to alert the host CPU of the presence of incoming data from the wireless network.

26. The computer system of claim 14 wherein said interface comprises a USB interface.

27. A method of managing power in a computer system that contains a wireless communication module that permits the computer system to communicate with a wireless communication network, comprising:

(a) transmitting a request for data to the wireless network;

(b) beginning to poll the wireless module over an electrical connection for the presence of incoming data from the wireless network; and (c) ceasing polling the wireless module over the electrical connection for the presence of data that has been received from the wireless network at a defined point in time.

28. The method of claim 27 wherein the defined point in time is the receipt of data from the network in response to the request.

29. A method of managing power in a computer system that contains a wireless communication module that permits the computer system to communicate with a wireless communication network, comprising:

(a) transmitting a request for data to the wireless network;

(b) waiting a time interval following (a);

(c) beginning to poll the wireless module over an electrical interface for the presence of incoming data from the wireless network upon expiration of the time interval in (b); and (d) ceasing polling the wireless module over the electrical interface for the presence of data that has been received from the wireless network at a defined point in time.

30. The method of claim 29 wherein said defined point in time the receipt of data from the network in response to the request.

31. The method of claim 29 wherein the time interval in (b) is preset.

32. The method of claim 29 wherein the time interval in (b) is programmable.

33. The method of claim 29 wherein the time interval in (b) dynamically varies.

* * * * *

UNITED STATES PATENT AND TRADEMARK OFFICE
CERTIFICATE OF CORRECTION

PATENT NO. : 6,944,687 B2 Page 1 of 2
APPLICATION NO. : 10/126059
DATED : September 13, 2005
INVENTOR(S) : Philip H. Doragh et al.

It is certified that error appears in the above-identified patent and that said Letters Patent is hereby corrected as shown below:

Sheet 1 of 1 – Drawings

Fig. 1, replace with the following figure:

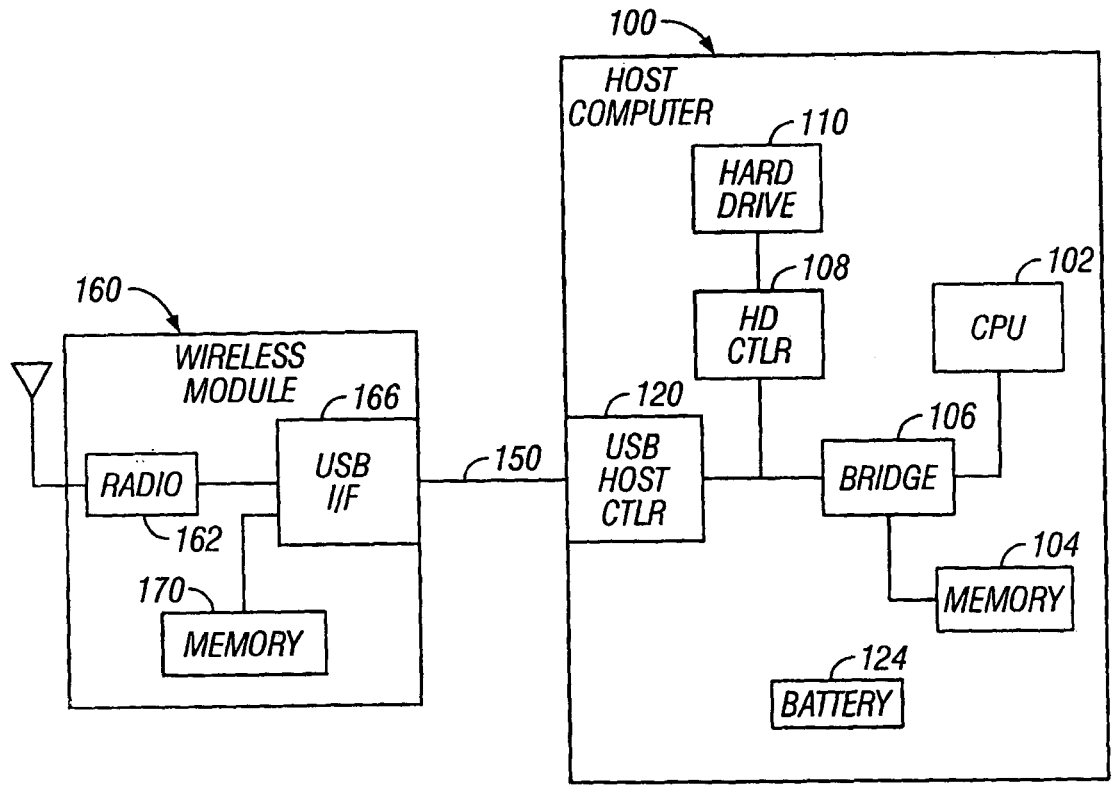

FIG. 1

UNITED STATES PATENT AND TRADEMARK OFFICE
CERTIFICATE OF CORRECTION

PATENT NO. : 6,944,687 B2  Page 2 of 2
APPLICATION NO. : 10/126059
DATED : September 13, 2005
INVENTOR(S) : Philip H. Doragh et al.

It is certified that error appears in the above-identified patent and that said Letters Patent is hereby corrected as shown below:

Sheet 1 of 1 – Drawings

Fig. 2, replace with the following figure:

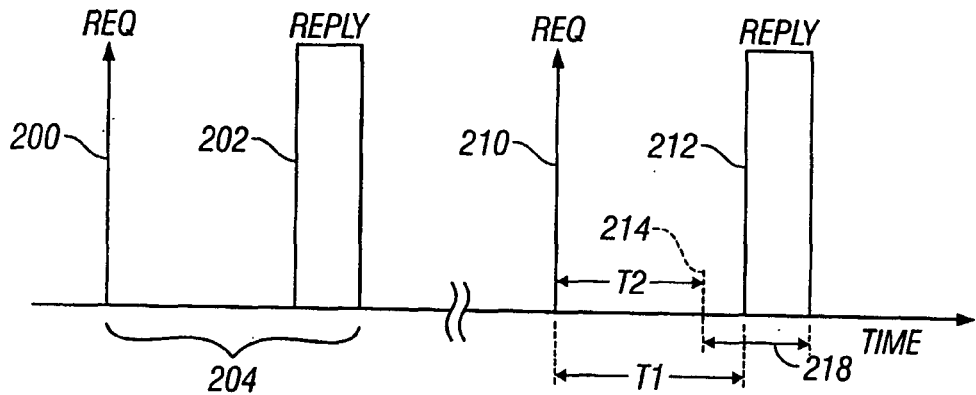

FIG. 2

Signed and Sealed this

Thirty-first Day of October, 2006

JON W. DUDAS
*Director of the United States Patent and Trademark Office*